Feb. 6, 1973   J. VAN VONDEREN   3,715,091
FILM TENSION SENSING SYSTEM FOR USE ESPECIALLY IN ELECTRICALLY
DRIVEN AUTOMATIC STEP AND REPEAT CAMERAS
Filed March 1, 1971   2 Sheets-Sheet 1

JACOBUS VAN VONDEREN
INVENTOR.

BY *Ronald W. Rangin*

ATTORNEY

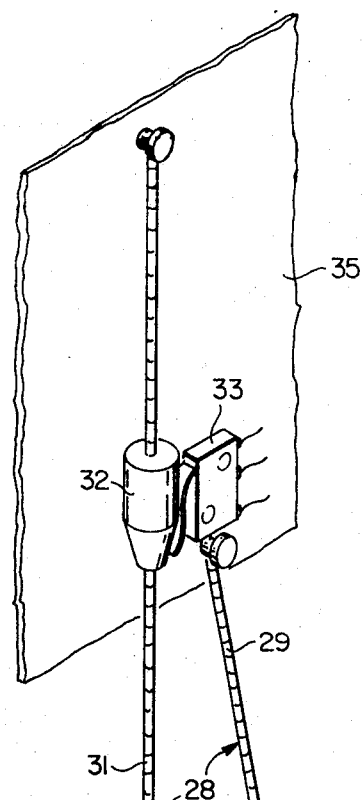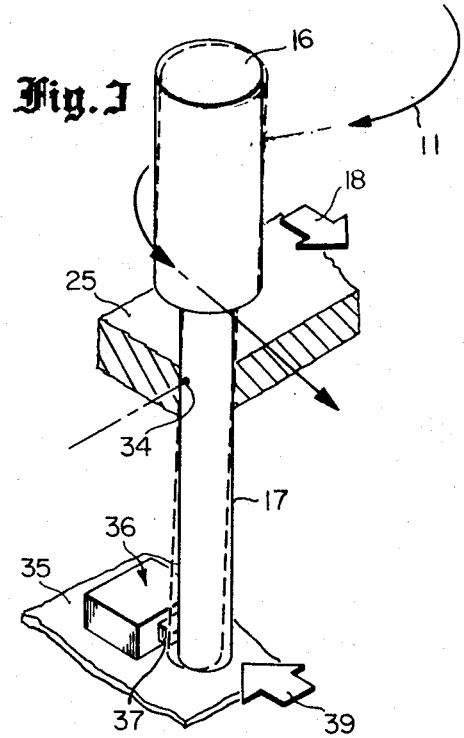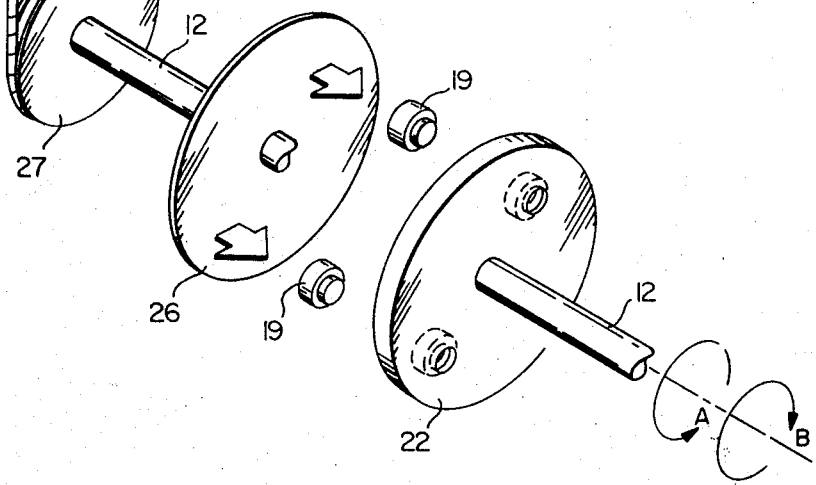

United States Patent Office 3,715,091
Patented Feb. 6, 1973

3,715,091
FILM TENSION SENSING SYSTEM FOR USE ESPECIALLY IN ELECTRICALLY DRIVEN AUTOMATIC STEP AND REPEAT CAMERAS
Jacobus van Vonderen, Covina, Calif., assignor to Teledyne, Inc., Los Angeles, Calif.
Filed Mar. 1, 1971, Ser. No. 119,468
Int. Cl. B65h 59/38; G03b 1/02; G11b 15/13
U.S. Cl. 242—191                                9 Claims

ABSTRACT OF THE DISCLOSURE

A film tension sensing system for use especially in electrically driven automatic step and repeat cameras.

The system comprises a film supply spool rotation direction sensor and film tensioner in conjunction with a rotatable film supply spool shaft, and a film tension sensor in conjunction with a film take-up spool shaft. The film supply spool shaft is coupled to a film supply spool rotatably mounted thereon by one or more spring biased drive pins which engage drive holes in the supply spool. The supply spool rotation direction sensor includes an override switch which cuts off electrical power to the film drive system when the supply spool rotates in the wrong direction. The film tension sensor employs a roller rotatably mounted on a non-rotating pivotally mounted shaft. Positive film tension on the sensor roller pivots the shaft to engage and close an override switch while lack of film tension permits the override switch to open and cut off power to the film drive system.

BACKGROUND OF THE INVENTION

This invention relates to automatic step and repeat cameras and more particularly to film tension sensing systems for use in such cameras.

Automatic cameras of a type which may employ the invention are described in co-pending application Ser. No. 119,467, filed March 1, 1971 by Jacobus van Vonderen and Maurice G. Amesbury now Pat. No. 3,680,461 and assigned to the assignee hereof. Such cameras are frequently used to take automatically a series of exposures on a long strip of film with an operator loading the film and setting up the camera but without a skilled attendant during what may be a relatively extended time required for the sequence of exposures.

It has been found desirable to equip these cameras with film tension sensing systems to prevent operation in the event of operator error in loading the film or in the event of breakage of the film strip during the sequence of exposures. In an electrically operated or controlled step and repeat camera, the film tension sensors according to the invention are adapted to interrupt the electrical power supplied to the film drive system in the event of improper loading, film breakage, failure of the film take-up to function properly, or other cause of relaxation of film tension.

SUMMARY OF THE INVENTION

The present invention provides, in an automatic step and repeat camera, a combined film tension brake and rotation direction sensor which functions in connection with the film supply spool shaft, and a film tension sensor located in the film path adjacent the film take-up spool shaft.

The brake and rotation direction sensor comprises, in a preferred embodiment, an extensible spring loop, an intermediate portion of which is in rotational frictional engagement with the film supply spool shaft. The end portions of the spring loop are fixed and a small boss on one of the end portions functions as an actuator to activate an adjacent microswitch when the spring is tensioned by rotation of the shaft in the proper direction. When the shaft rotates in the opposite direction tension is released on the actuator carrying end portion of the spring loop and the actuator allows the switch to open, interrupting the electrical power supply to the film drive system. The film supply spool shaft is rotationally coupled to the supply spool by a drive plate affixed to the shaft. The drive plate carries one or more spring loaded drive pins adapted to engage drive holes in the film supply spool. Thus, if the operator loads the film supply incorrectly on the supply shaft, the film transport system will cause the supply spool shaft to rotate in the wrong direction, relaxing tension on the spring loop end portion carrying the actuator. The actuator will move away from the switch, allowing it to open and interrupt the power supplied to the drive system and shutting off the camera. When the film is properly loaded, the rotation of the shaft produced by the film being pulled off the supply spool by the drive system causes the spring portion carrying the actuator to be tensioned. The actuator is maintained in a position to actuate the switch and maintain the power supplied to the drive system. The friction of the spring loop against the supply spool shaft provides a desirable back-tension on the film strip to prevent overrun of the supply spool and to maintain the proper movement of the film along the film path.

The film tension sensor comprises a film roller positioned to engage a loop of the film strip. The roller is rotatably mounted on a shaft which is pivotally mounted so that tension of the film loop against the roller pivots the shaft to a predetermined position. A microswitch is positioned to be actuated by the shaft when the latter is in the predetermined position. In the event of film breakage, or a failure of the take-up portion of the film drive system, the tension on the film strip will be released and the switch will be allowed to open, interrupting the electrical power supply to the film drive system.

BRIEF DESCRIPTION OF THE DRAWINGS

In the drawings

FIG. 2 is a detailed exploded perspective view of the brake and rotation direction sensor portion of the mechanism depicted in FIG. 1; and FIG. 3 is a detailed perspective view of the film tension sensor portion of the mechanism depicted in FIG. 1.

DESCRIPTION OF THE PREFERRED EMBODIMENT

Figure 1:
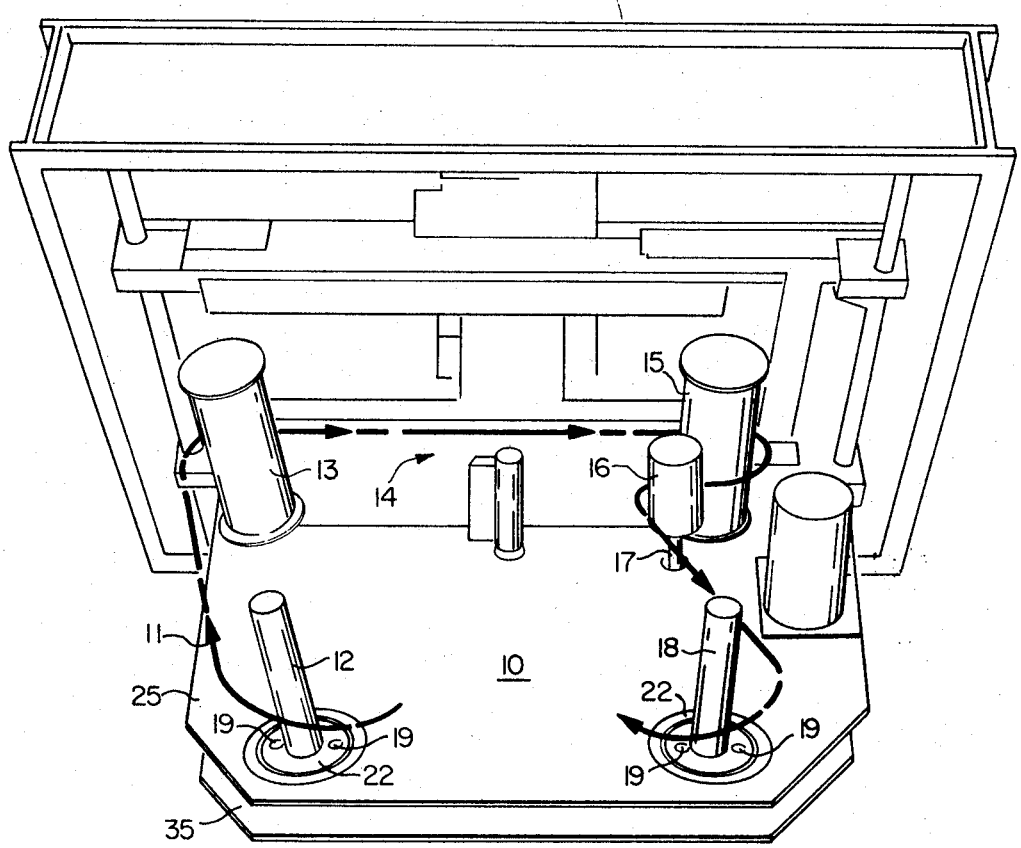
FIG. 1 is a perspective view of a film transport system embodying the invention.

FIG. 1 depicts a film transport system 10 of an automatic step and repeat camera embodying the invention. The system 10 comprises a supply spool shaft 12 adapted to receive a film supply spool (not shown) which may or may not be enclosed in a light tight cassette. The path of a film strip in the system 10 is traced by dotted line 11. The film strip is threaded through the transport system 10 from the supply spool around an idle roller 13, across a picture area 14 and around a metering roller 15. From the metering roller 15 the film strip passes around a film tension sensing roller 16 which is rotatably mounted on a tension sensing shaft 17. Shaft 17 is pivoted about an axis which is generally normal to the direction of the force of the film against roller 16. Roller 16 is positioned to assure a good wrap of the film strip around the metering roller 15. Finally, the film strip goes from the tension roller 16 to a take-up spool (not shown) rotatably mounted on a take-up spool shaft 18.

The supply spool shaft 12 couples to the film supply spool (not shown) by means of a pair of spring biased drive pins 19 which protrude through holes in a film spool drive plate 22 affixed to shaft 12. The protruding portions of pins 19 are adapted to engage corresponding recess in an end-flange of a supply spool. Because pins 19 are spring biased, the supply spool may be mounted in any rotational position on shaft 12 and will be engaged by pins 19 on the first revolution. A similar spool drive coupling is advantageously used to couple the film take-up shaft 18.

Idle roller 13 and metering roller 15 maintain the desired orientation of the film strip across picture area 14. Metering roller 15 is rotated by frictional engagement with the film strip and measures the linear motion of the film strip along the film path during the longitudinal film movement portion of the camera cycle.

FIG. 2 depicts the portion of the film tensioning and rotation direction sensing apparatus associated with shaft 12 but concealed from view in FIG. 1 by drive plate 22 and mounting deck plate 25. In particular, the exploded detailed view of the spool coupling shows a disc spring or resilient washer 26 affixed to shaft 12 to provide a spring bias to drive pins 19. Also shown is the tensioning and rotation direction sensing apparatus comprising a pulley 27 on shaft 12. Pulley 27 frictionally engages an extensible spring loop 28 having fixed end portions 29 and 31. End portion 31 of spring loop 28 carries a small boss 32 adapted to actuate a switch 33 which is affixed to back plate 35.

When shaft 12 rotates in the A direction, the frictional engagement of pulley 27 and spring loop 28 tensions and extends end portion 31 and relaxes end portion 29 of loop 28. Extension of end portion 31 moves boss 32 into position to actuate switch 33. When shaft 12 is rotated in the B direction end portion 31 of loop 28 is relaxed and boss 32 moves away from switch 33 which is deactuated. Thus, if the camera operator inserts the film supply spool incorectly on shaft 12 the rotation of shaft 12 in the wrong direction will cause boss 32 to deactuate switch 33 and turn off the power supply to the film transport drive system. Rotation of the shaft 12 in the correct direction will maintain boss 32 in position to actuate switch 33 and continue uninterrupted the power supply to the drive system.

In addition to sensing the rotation direction of the shaft 12, the frictional engagement of spring loop 28 and pulley 27 provides a desirable back-tension on the film strip by acting as a form of simple mechanical brake or slip clutch.

The perspective detailed view of FIG. 3 shows the film tension sensing portion of the preferred embodiment of the invention. Tension sensing roller 16 is rotatably mounted on shaft 17 which is pivotal about an axis 34 generally normal to the resultant direction of the force of the film tension against roller 16. Shaft 17 extends through deck plate 25 which advantageously serves as the pivot mount. Thus, shaft 17 may be rocked about the pivot axis 34 and the portion of the shaft 17 below deck plate 25 provides a mechanical indication of the position of roller 16 as it is acted upon by the tension of the film strip.

A switch 36 is mounted on back plate 35 in a position adjacent the extension of shaft 17 below deck plate 25. Switch 36 is actuated by a spring biased lever 37 in contact with the end portion of shaft 17. Thus tension of the film strip acting against roller 16 in the direction of arrow 39 rocks shaft 17 about axis 34 causing the end portion of shaft 17 to move in the direction of arrow 18 to depress lever 37 and actuate switch 36 which controls power supply to the film transport drive system. If film tension is broken by breakage of the film strip failure of the take-up mechanism or other reason, shaft 17 is rocked away from lever 37 allowing switch 36 to open and cutting off power to the drive system.

Although the invention has been described with respect to a particular embodiment many modifications and variations are possible and may be made by those skilled in the art without departing from its scope and spirit.

What is claimed is:

1. In a step and repeat camera, a film tension sensing system comprising:
   a rotatable film supply spool shaft;
   coupling means on the supply spool shaft for engaging a film supply spool mounted thereon, whereby rotation of the spool is communicated to the shaft;
   rotation direction sensing and braking means coupled to the suply spool shaft comprising an extensible loop member having two end portions and an intermediate portion, the intermediate portion being in rotational frictional engagement with the supply spool shaft and
   a switch actuator mounted on one of the end portions and movable between a first position when the loop member is tensioned by rotation of the shaft in one direction and a second position when the loop member is tensioned by rotation of the shaft in the opposite direction;
   a film take-up spool shaft; and
   film tension sensing means in the film path adjacent the film take-up spool shaft.

2. In a step and repeat camera, a film tension sensing system as in claim 1 and further comprising electrical switch means adapted to be actuated by the actuator in the first position.

3. In a step and repeat camera, a film tension sensing system as in claim 2 wherein the switch means is adapted to interrupt electrical power supplied to a film transport system when the actuator is in the first position.

4. In a step and repeat camera, a film tension sensing system comprising:
   a rotatable film supply spool shaft;
   coupling means on the supply spool shaft for engaging a film supply spool mounted thereon, whereby rotation of the spool is communicated to the shaft;
   rotation direction sensing and braking means coupled to the supply spool shaft;
   a film take-up shaft; and
   film tension sensing means in the film path adjacent the film take-up spool shaft comprising:
      an elongated tension shaft and a film roller rotatably mounted on the tension shaft, the tension shaft being mounted to pivot about an axis normal to the rotational axis of the roller and with the roller positioned to engage a loop of a film strip being transported in the film path, the tension shaft being pivotal to a first position under the influence of film tension applied to the roller.

5. In a step and repeat camera, a film tension sensing system as in claim 4 and further including electrical switch means adapted to be actuated by the tension shaft.

6. In a step and repeat camera, a film tension sensing system as in claim 5 wherein the switch means is adapted to maintain electrical power supplied to a film transport system when the tension shaft is pivoted by the tension of a film strip against the roller.

7. In a step and repeat camera, a film supply spool rotation direction sensor comprising:
   a rotatable film supply spool shaft;
   coupling means on the shaft for engaging a film supply spool mounted thereon, whereby rotation of the spool causes rotation of the shaft;
   an extensible loop member having two end portions and an intermediate portion, the intermediate portion being in rotational frictional engagement with the shaft;
   a switch actuator mounted on one of the end portions and movable between a first position when the loop member is tensioned by rotation of the shaft in one direction and a second position when the loop member is tensioned by rotation of the shaft in the opposite direction;

electrical switch means adapted to be actuated by the actuator in the first position, the switch means being further adapted to maintain electrical power supply to a film transport system when the actuator is in the first position.

8. In a step and repeat camera, a film tension sensor comprising:
   an elongated shaft;
   a film roller rotatably mounted on the shaft;
   the shaft being pivotally mounted with the roller positioned to engage a loop of a film strip in a film path from a supply spool to a take-up spool, the shaft being pivotal about an axis normal to the rotational axis of the roller and to a first position under the influence of film tension applied to the roller;
   electrical switch means adapted to be activated by the shaft in the first position and further adapted to maintain electrical power supplied to a film transport system when actuated by the shaft.

9. In a step and repeat camera, means coupling a film spool to a rotatable film spool shaft, comprising:
   a circular drive plate affixed to the shaft and positioned to be adjacent the end flange of a film spool mounted on the shaft;
   at least one drive pin hole in the drive plate at a point removed from the center thereof;
   a drive pin positioned in each of the drive pin holes, the pins and holes being adapted to permit movement of the pins in a direction parallel to the shaft, the pins being longer than the thickness of the drive plate whereby the pins may be positioned with their ends remote from the face of the drive plate adjacent the film spool flange position in the plane of that face and their opposite ends protruding through the plate;
   spring biasing means affixed to the shaft to urge the pins to protrude through the drive plate toward the film spool end flange position; and
   means to limit the movement of the pins through the drive pin holes in the direction of the film spool end flange position.

References Cited

UNITED STATES PATENTS

| | | | |
|---|---|---|---|
| 2,232,546 | 2/1966 | Ferrand et al. | 242—189 |
| 3,092,296 | 6/1963 | Andrews | 242—189 X |
| 3,438,590 | 4/1969 | Hugel | 242—198 |

LEONARD D. CHRISTIAN, Primary Examiner

U.S. Cl. X.R.

352—182